United States Patent Office 3,358,000
Patented Dec. 12, 1967

3,358,000
PROCEDURE FOR THE PREPARATION OF
BENZO-γ-PYRONES
André Vincent, Somme, France, assignor to Societe
Chimie et Synthese de Picardie, Somme, France, a
corporation of France
No Drawing. Filed June 19, 1964, Ser. No. 376,564
Claims priority, application France, July 17, 1963,
941,786, Patent 1,370,795
10 Claims. (Cl. 260—345.2)

The present invention has for its object a procedure for the preparation of benzo-γ-pyrones substituted in the three positions by a group of alkyl or aryl generally corresponding to the following formula sequence:

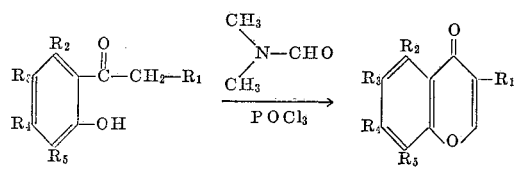

$R_1$ is a lower alkyl group (linear or branch chain) or an aryl group such as phenyl which may be substituted, if desired, by one or more of the following: halogen, lower alkyl; and $R_2$, $R_3$, $R_4$, and $R_5$ (which may be the same or different) are each a member selected from the group of hydrogen or one of the above substituents, i.e., halogen, lower alkyl.

The present procedure consists of reacting dimethyl formamide and an o-hydroxyl-aryl ketone in the presence of phosphorous oxychloride. Among the ketones of Formula II employable are the following exemplary ketones:

(a) 2-hydroxy propiophenone;

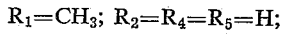
$R_1=CH_3$; $R_2=R_4=R_5=H$;

the product obtained (Formula I) being 3-methyl chromone.

(b) 2-hydroxy 5-chloro propiophenone wherein

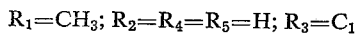
$R_1=CH_3$; $R_2=R_4=R_5=H$; $R_3=C_1$ the product obtained being 3-methyl-6-chloro chromone.

(c) 2-hydroxy 3-chloro propiophenone; wherein

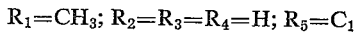
$R_1=CH_3$; $R_2=R_3=R_4=H$; $R_5=C_1$ the product obtained being 3-methyl-8-chloro chromone.

(d) (2-hydroxy 5-methyl phenyl) benzyl ketone, Formula II, wherein

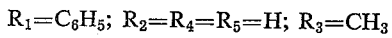
$R_1=C_6H_5$; $R_2=R_4=R_5=H$; $R_3=CH_3$ the product obtained being 3-phenyl 6-methyl chromone.

Without being bound thereto, it is theorized that the dimethyl formamide-phosphorous oxychloride complex acts as a formylation agent. It affixes a formyl group to the active methyl group of the ketone chain. After enolization the resulting derivative cyclodehydrates around the ortho phenol group in the acidic reaction mixture, acidity being assured by presence of the phosphorous oxychloride.

In addition to its role of formylation agent, the dimethyl formamide acts as a solvent. Thus the present procedure utilizes a large excess over the stoichiometric requirement for the reaction. By contrast, essentially equimolar quantities of phosphorous oxychloride and ketone are employed.

An advantageous preliminary step is formation of a complex of the phosphorous oxychloride and the dimethyl formamide which subsequently is added to the ketone and more of the dimethyl formamide.

The complex is preferably prepared at between 0° and 10° C., and the reaction of the complex with the ketone is effected below 40° C. The reaction mixture is admixed with water then extracted with benzene or a similar organic solvent under alkaline conditions. The mixture then stratifies into two layers, an aqueous layer from which can be recovered the unreacted ketone (after neutralization) and the organic layer from which can be recovered the desired product. Below described in detail is a preferred technique for practice of the present invention.

In a three-necked reaction flask in which is mounted a thermometer and agitator, two moles of dimethyl formamide are introduced. The temperature is maintained in the range of 0° C. to 10° C. by external refrigeration, while under agitation one mole phosphorous oxychloride is added progressively. The complex thus formed is warmed to about 25° C. and transferred to a dropping funnel mounted on a reactor. A mixture of two moles dimethyl formamide and one mole of orthohydroxy ketone (a molar proportion of 2:1) is introduced into the reactor and maintained at 15° C. Over a 45-minute interval the complex previously formed is added slowly in small portions while maintaining the reaction mixture under agitation. The temperature rises slowly but is stabilized below +35° C. by means of external cooling. After all of the complex has been added the temperature is allowed to rise to 40–45° C. and then maintained there for two hours with continued agitation. Thereafter the reaction mixture is dumped into two liters of water and heated to a boil under reflux for about thirty minutes. After being cooled, the reaction mixture is extracted with benzene. The benzene phase is washed several times with the solution of 1.5 N alkali which results in an alkaline extract and an organic residue which are separately treated.

The alkaline extract is acidified to neutrality with hydrochloric acid. The immiscible organic material which is thus freed is extracted with benzene. The benzene phase is decanted, washed with water, dried over sodium sulfate. Then the solvent is evaporated and the residue distilled under reduced pressure (about 15 mm. of mercury). Recovered thereby is the unreacted ketone.

The organic solution is washed with water, dried over sodium sulfate. The solvent is eliminated by distillation under reduced pressure (about 15 mm. of mercury) and the product recovered. The benzo-γ-pyrone thus obtained is purified by recrystallization in an appropriate solvent.

By concentration of the mother liquor from the recrystallization there can be obtained a residue which under reduced pressure distillation provides an additional recovery of unreacted ketone plus a small supplementary quantity of benzo-γ-pyrone product.

The specific examples of the application of the present technique as given below further illustrate the invention, without, however, limiting the scope thereof only to the compounds named.

Example 1

Synthesis of 3-methyl chromone (where $R_1=CH_3$, $R_2$, $R_3$, $R_4$, $R_5$ are all H).

The procedure is according to the previously detailed technique using 150 grams of dimethyl formamide and 154 grams of phosphorous oxychloride to form the complex, then 150 grams dimethyl formamide and 150 grams 2-hydroxy propiophenone for the reaction.

The product recovery is initially 56 grams (approximately 37.3%) from which is obtained 53 grams (approximately 33.1% yield) of 3-methyl chromone in the form of colorless crystals, M.P. —68° C. after recrystallization from petroleum ether.

Analysis.—$C_{10}H_8O_2=160$, Calculated, percent C= 75.00, H=5.00. Found, percent C=74.90, H=5.12.

Example 2

Synthesis of 3 methyl 6-chloro chromone (where $R_1=CH_3$, $R_2=R_4=R_5=H$; $R_3=Cl$).

Employing the same procedure, the following quantity of reactants were used: 73 grams dimethyl farmamide and 77 grams of phosphorus oxychloride, then 93 grams 2-hydroxy 5-chloro propiophenone and 75 grams dimethyl formamide.

The product is 32 grams, about 33% yield of 3 methyl 6-chloro chromone which recrystallizes from cyclohexane in colorless crystals; M.P.=95° C.

*Analysis.*—$C_{10}H_7O_2$ Cl=194.5, Calculated, percent C=61.69; H=3.59; Cl=18.25. Found, percent C=61.25; H=4.01; Cl=18.35.

Example 3

Synthesis of 3 methyl 8-chloro chromone (where $R=CH_3$; $R_2=R_3=R_4=H$; $R_5=Cl$).

Quantity of reactants: 49 grams dimethyl formamide and 77 grams of phosphorus oxychloride, then 60 grams 2-hydroxy 3-chloro propiophenone and 49 grams dimethyl formamide.

The product was 10.5 grams, about 15% yield of 3 methyl 8-chloro chromone which formed colorless crystals in petroleum ether recrystallization; M.P.=60–61° C.

*Analysis.*—$C_{10}H_7O_2$ Cl=194.5, Calculated, percent C=61.69; H=3.59; Cl=18.25. Found, percent C=61.60; H=3.71; Cl=18.10.

Example 4

Synthesis of 3-phenyl 6-methyl chromone (or 6-methyl isoflavone) where $R_1=C_6H_5$; $R_2=R_4=R_5=H$; $R_3=CH_3$.

Quantity of reactants: 30 grams dimethyl formamide and 31 grams phosphorus oxychloride, then 30 grams dimethyl formamide and 43 grams of (2-hydroxy 5-methyl phenyl) benzyl ketone.

The product is 29 grams, about 64.7% yield, of 6-methyl isoflavone which recrystallizes from a mixture of cyclohexane and petroleum ether in very pale yellow needles; M.P.=109° C.

*Analysis.*—$C_{16}H_{12}O_2=236$, Calculated, percent C=81.35; H=5.08. Found, percent C=80.93; H=4.90.

What is claimed is:

1. A process for preparing benzo-γ-pyrones of the following formula

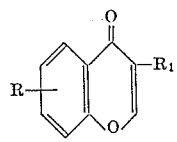

wherein R is a member selected from the group consisting of H, Cl, lower alkyl; and wherein $R_1$ is a member selected from the group consisting of lower alkyl and R substituted phenyl, by reacting an O-hydroxy ketone of the following formula

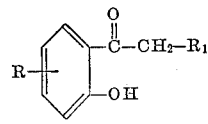

with dimethyl formamide in the presence of phosphorous oxychloride and in the presence of dimethyl formamide in excess of stoichiometric requirements for the reaction.

2. The process of claim 1 wherein a complex of phosphorous oxychloride and dimethyl formamide is reacted with the ketone in the presence of excess dimethyl formamide.

3. The process of claim 2 wherein equimolar quantities of phosphorous oxychloride and ketone are employed.

4. The process of claim 1 wherein the reaction mixture is added to water, the chromone product is taken up in an organic solvent, and is thereafter recovered therefrom.

5. The process of claim 1 wherein R is Cl and $R_1$ is $CH_3$.

6. A process according to claim 1 for preparing 3-methyl chromone by reacting O-hydroxy propiophenone with dimethyl formamide in the presence of phosphorous oxychloride.

7. A process according to claim 1 for preparing 3-methyl 6 chloro chromone by reacting 2-hydroxy 5-chloro propiophenone with dimethyl formamide in the presence of phosphorous oxychloride.

8. A process according to claim 1 for preparing 3-methyl 8 chloro chromone by reacting 2-hydroxy 3-chloro propiophenone with dimethyl formamide in the presence of phosphorous oxychloride.

9. A process according to claim 1 for preparing 3-phenyl-6 methyl chromone by reacting (2-hydroxy-5-methyl phenyl) benzyl ketone with dimethyl formamide in the presence of phosphorous oxychloride.

10. A process for preparing benzo-γ-pyrones of the following formula

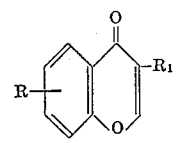

wherein R is a member selected from the group consisting of H, Cl, lower alkyl; and wherein $R_1$ is a member selected from the group consisting of lower alkyl and R substituted phenyl, by reacting an O-hydroxy ketone of the following formula,

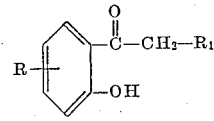

which comprises forming a complex of phosphorous oxychloride in dimethyl formamide at a temperature of about 0° C.–10° C. then slowly adding the complex to a solution of said O-hydroxyketone in dimethyl formamide and maintaining said solution at reaction temperatures below about 40° C. the total quantity of dimethyl formamide being in excess of stoichiometric requirements for the reaction.

References Cited

UNITED STATES PATENTS 3,040,079   2/1964   Joly et al. _____ 260—345.2

NORMAN S. MILESTONE, *Primary Examiner.*